United States Patent [19]

Suzuki et al.

[11] 4,188,555

[45] Feb. 12, 1980

[54] STATOR OF UNI-DIRECTIONAL SELF STARTING SYNCHRONOUS MOTOR

[75] Inventors: Yasuo Suzuki; Tosihisa Hirai, both of Shijonawate, Japan

[73] Assignee: Matsushita Electric Works, Ltd., Japan

[21] Appl. No.: 761,796

[22] Filed: Jan. 24, 1977

[30] Foreign Application Priority Data

Jan. 30, 1976 [JP] Japan ............................ 51/11297[U]

[51] Int. Cl.² ............................................. H02K 19/00
[52] U.S. Cl. ..................................... 310/162; 310/41; 310/89; 310/90; 310/194; 310/257
[58] Field of Search ................... 310/41, 40 MM, 162, 310/163, 164, 268, 254, 90, 194, 257, 258, 259, 89, 42, 71, 179, 180, 72, 85, 49; 58/23 D; 335/278

[56] References Cited

U.S. PATENT DOCUMENTS

| | | | |
|---|---|---|---|
| 2,412,461 | 12/1946 | MacIntyre | 310/164 |
| 3,614,495 | 10/1971 | Suzuki | 310/162 |
| 3,657,583 | 4/1972 | Tamaru | 310/40 MM |
| 3,967,147 | 6/1976 | Preiser | 310/72 |
| 3,984,709 | 10/1976 | Kuwako | 310/40 MM |

FOREIGN PATENT DOCUMENTS

| | | | |
|---|---|---|---|
| 2405605 | 8/1975 | Fed. Rep. of Germany | 310/89 |
| 1388076 | 3/1973 | United Kingdom | 310/89 |

Primary Examiner—R. Skudy
Attorney, Agent, or Firm—Leydig, Voit, Osann, Mayer & Holt, Ltd.

[57] ABSTRACT

A stator of uni-directional self starting synchronous motor of which magnetic pole teeth formed flatly integral with a yoke for opposing a flat disk shape rotor having axial rotary shaft. The yoke is of an elongated plate having adjacent an end the pole teeth comprising radially alternately extending inner and outer teeth formed as punched and joined through a connecting part, the plate is bent into a substantially U shape in section, a core of a magnetic material having an axial hole for passing therethrough the shaft of rotor is disposed between opposing both end parts of the yoke coaxially with the teeth to provide main magnetic path, and a coil wound on a bobbin is disposed around the core.

4 Claims, 8 Drawing Figures

STATOR OF UNI-DIRECTIONAL SELF STARTING SYNCHRONOUS MOTOR

This invention relates to synchronous motors and, more particularly, to improvements in stators of uni-directional self starting synchronous electric motors wherein a disk-shaped rotor is opposed to a stator having magnetic pole teeth.

U.S. Pat. No. 3,614,495 has already suggested a synchronous motor of this kind wherein the magnetic pole teeth of the stator are mutually integrally formed but separately from stator core yoke. For this reason, the motor according to this United States patent requires a mounting step of the teeth to the yoke and, at this time, there are caused to occur such problems that torque characteristics may be subject to fluctuations due to any possible unevenness of magnetic resistance at mounting part of the teeth to the yoke and that magnetic air gaps may also be subject to fluctuations due to any dimensional fluctuations possibly caused by deformations of the respective teeth at the time of the mounting.

The present invention has been suggested to remove such problems in the conventional motors of the kind referred to and, according to the present invention, the problems have been successfully solved by a novel formation of a yoke in which an inner pole tooth group and an outer pole tooth group are integrally coaxially formed, the yoke is bent into a U-shape and provided with a shaft hole at axial centre of the both pole tooth group.

A primary object of the present invention is to provide a synchronous motor having few component parts.

A further object of the present invention is to provide a synchronous motor which is high in the assembling precision.

Another object of the present invention is to provide a synchronous motor which is simple in the structure.

Other objects and advantages of the present invention shall be made clear as the following disclosures advance as detailed with reference to preferred embodiments of the present invention shown in accompanying drawings, in which.

Figure 1:
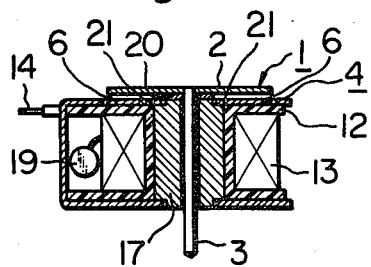
FIG. 1 is a vertically sectioned view of an essential part of a synchronous motor according to the present invention.
Figure 2:
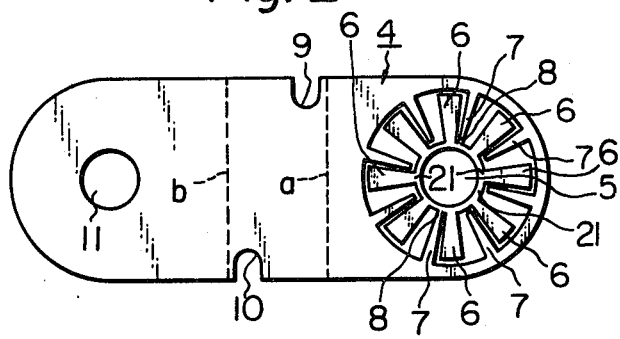
FIG. 2 is a plan view as developed of a yoke employed in the motor of FIG. 1.

Referring to FIGS. 1 and 2, a disk-shaped rotor 1 is formed of a disk-shaped body 2 and an axial rotary shaft 3. The body 2 has magnetizations equal in number to motor poles and alternately in the order of N, S, N, S, . . . radially from the centre on the side to be opposed to magnetic pole teeth of a yoke 4. As shown in FIG. 2, the yoke 4 is provided with an annular part 21 concentrically around a hole 5 for receiving a top end of a later described shaft bearing 17, with a plurality of inner pole teeth 6 extending radially outward from the annular part 21 and with a plurality of outer pole teeth 7 extending inward to the shaft hole 5 so as to respectively lie between the inner pole teeth 6. It is preferable that each inner pole tooth 6 is formed to be twice or three times as wide as each outer pole tooth 7. Further, relative positional relation between the inner and outer pole teeth 6 and 7 is such that the outer pole teeth 7 are deviated in desired rotating direction of the rotor 1 from their positions in which all of the teeth 6 and 7 are arranged as spaced at regular intervals, so that the uni-directional self-startability of the rotor 1 can be obtained by such formation. The reason for it is explained in detail in the U.S. Pat. No. 3,614,495.

While the both groups of the inner and outer pole teeth 6 and 7 are separated, that is, the annular part 21 having the inner pole teeth or spokes 6 is normally separated from the yoke body having the outer pole teeth or spokes 7, a certain least number of integral connecting parts, in the form of integral radial bridges 8 are formed between some of the teeth 6 or 7 and the yoke body or annular part 21, for example, between a pair of radially opposing teeth 7 and the annular part 21, so that the inner pole teeth 6 as well as the annular part 21 are supported by the outward pole teeth 7. As shown in FIG. 2, only a minor portion of the teeth (spokes) are provided with integral bridges 8, for example, the bridges may be two in number, lying in angularly distributed positions.

Figure 3B:
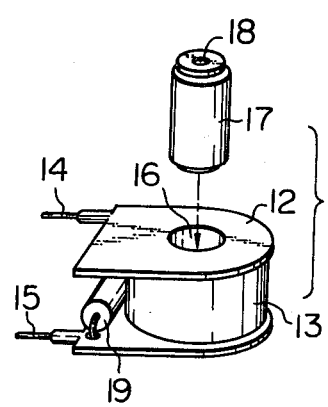
FIGS. 3A to 3E are perspective views showing assembly sequences of the motor shown in FIGS. 1 and 2.

As shown in FIG. 2, the yoke 4 of an elongated elliptic shape as developed is provided with the shaft hole 5 on one side with respect to the centre and with the inner pole teeth 6 and outer pole teeth 7 as described above around the shaft hole 5, and further with incisions 9 and 10 on both sides substantially in the middle of the elliptic shape where the yoke is to be bent, and a hole 11 for receiving bottom end of the bearing 17 on the other side opposed to the side on which the pole teeth groups are provided. The elliptic yoke 4 is bent at the parts shown by broken lines a and b in FIG. 2 so as to be substantially a U-shape in the cross-section, so that the hole 11 is to be in alignment with the hole 5 as shown in FIG. 1 or 3B. The yoke 4 is made of a thin magnetic material plate.

Figure 3A:
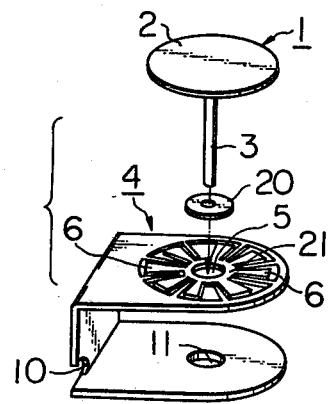

In FIG. 3A, there is shown a coil 13 as wound on a coil bobbin 12 made of a synthetic resin and provided with connecting terminals 14 and 15. A hole 16 is formed in the coil bobbin 12. A cylindrical shaft bearing 17 made of a magnetic material is inserted in said hole 16. The bearing 17 is provided with an axial hole 18 for receiving the rotary shaft 3 of the rotor 1. This bearing 17 is to be made a main magnetic path for providing the magnetizm to the magnetic pole teeth 6 together with the yoke. A voltage reducing element 19 comprising a condenser, resistance or semiconductor element is mounted to the bobbin 12 as connected with a lead wire of the coil 13.

Then the coil bobbin 12 with the coil 13, bearing 17 and element 19 is inserted into the yoke 4 which is in the state of FIG. 3B, so that the centre of the shaft hole 5 will be aligned with the axial hole 18 of the bearing 17, the top and bottom ends of the bearing 17 are received in the respective holes 5 and 11 of the yoke 4 and calked so that the bearing 17 will be fixed to the yoke 4. Thereafter, the shaft 3 of the rotor 1 is inserted into the hole 18. In this case, a ring-shaped spacer 20 made of a synthetic resin is fitted around the shaft 3 so as to be interposed between the inside surface of the disk body 2 of the rotor 1, that is, the surface opposed to the magnetic pole teeth of the yoke 4 and is bonded to the rotor body 2 with a binder (see FIG. 1).

Figure 3C:
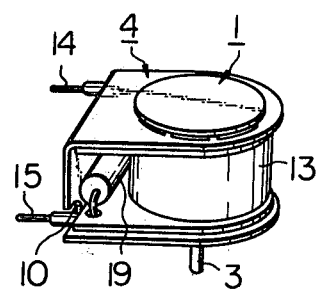
Figure 3D:
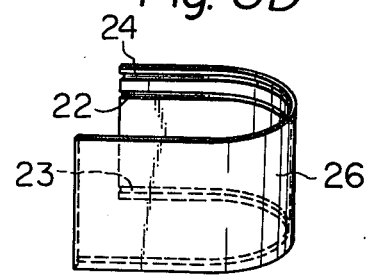
Figure 3E:
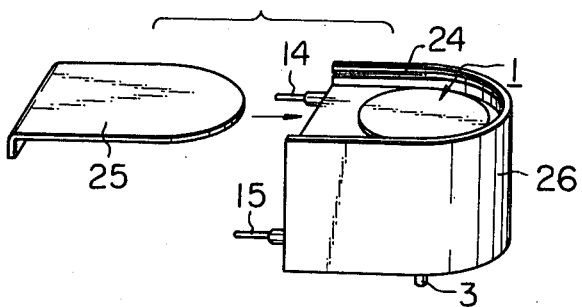

Then, as shown in FIG. 3D, the above described assembly of FIG. 3C is inserted into a covering 26 formed of a synthetic resin or metal in a U-shape and having grooves 22, 23 and 24 formed inside so that the upper side edge of the yoke 4 will be inserted in the groove 22 and the lower side edge of the yoke will be inserted in the groove 23. A plate cover 25 also made of plastics is inserted into the groove 24 as shown in FIG. 3E above the disk body of the rotor 1.

In this case, the connecting terminals are exposed out of the parts of the incisions 9 and 10 in the yoke 4. The voltage reducing element 19 is connected in series with the coil 13.

The operation of the above described motor shall be explained in the following. When an alternating voltage applied to the coil 13, the inner pole teeth 6 of the yoke will be magnetized mutually in opposite polarities by the magnetic fluxes caused thereby to produce magnetic attractions or repulsions between them and magnetic poles of the rotor 1, so that the rotor 1 will be rotated. This operation is also described in detail in the U.S. Pat. No. 3,614,495.

Figure 4:
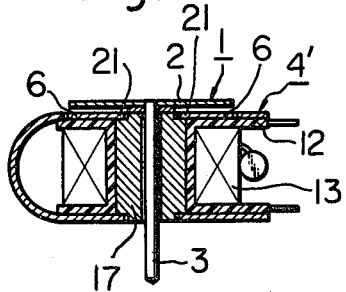
FIG. 4 is a similar sectioned view to FIG. 1 but showing another embodiment of the present invention.

In FIG. 4, another embodiment of the yoke according to the present invention is shown, in which the bent part of the yoke 4' is smoothly curved to be semi-circular. When the yoke is bent in this manner, the magnetic characteristics will be able to be prevented from being deteriorated by acutely bending the yoke plate.

According to the present invention, as the yoke is formed from a plate member including the inner and outer pole teeth groups and bent into a substantially U-shape, there can be expected such effects that:

(a) As the respective inner and outer pole teeth of the stator are formed integrally with the stator core yoke according to the present invention, any coupling work of them by means of calking, soldering or the like is not required at all so that the motor according to the present invention will not be subject at all to any fluctuations in the torque characteristics due to fluctuations in the magnetic resistance caused at the time of such conventionally required coupling as above and also not to the dimensional fluctuations due to any deformations of respective parts caused by the coupling and thereby the magnetic gaps can be maintained regularly optimumly.

(b) As the magnetic pole teeth groups and yoke of the stator are made integral, required parts are remarkably reduced in number and, as only a punching work is necessary for providing such integral stator, a high dimensional precision can be maintained, while manufacturing costs can be remarkably reduced.

(c) As the yoke of the present invention does not require any pressing work but only a bending work is called for other than the punching, the manufacturing costs can be reduced in this respect, too.

What is claimed is:

1. A unidirectional self-starting synchronous motor comprising, in combination, an annular coil having flat end surfaces, a cylindrical bearing of magnetic material containing a hole, said cylinder bearing being fitted into the coil extending between the end surfaces, a unitary yoke including a single continuous strip of magnetic material having a "U" shaped cross-section with the free ends thereof defining opposed flat parts being spaced to lie flatly adjacent the respective end surfaces of the coil, said yoke including an annular part containing a hole, a plurality of inner pole teeth extending radially outwardly from said annular part, and a plurality of outer pole teeth extending inwardly toward said annular part, each said inner pole tooth being substantially wider in the circumferential direction than each said outer pole tooth, said outer pole teeth being positioned to be between said inner pole teeth, respectively, said annular part and said inner pole teeth being separated from the remaining portion of said yoke except for a plurality of connecting parts for connecting said annular part to some of said teeth and the remaining portion of said yoke, said connecting parts being less in number than the number of said outer pole teeth, said teeth forming poles of alternate polarity when the coil is energized, a rotor in the form of a disc-shaped body having a number of magnetizations thereon cooperating with the poles of alternate polarity and having a shaft extending perpendicularly to the disc-shaped body, the shaft extending through the hole in said annular part and being rotatably journaled in the hole of the cylindrical bearing, said outer pole teeth being positionally deviated, from an equally spaced position relative to said inner pole teeth, toward said inner pole teeth in the desired direction of rotation of said rotor, said yoke including said annular part and said inner and outer pole teeth forming one integral stator.

2. The motor according to claim 1 wherein a U-shaped cover is fitted to the U-shaped yoke, the cover being oriented at right angles to the yoke to complimentarily enclose the latter.

3. The motor according to claim 1, wherein said coil is wound on a bobbin having flat sides lying adjacent the opposed flat parts of the yoke, the bobbin having terminals projecting generally at right angles to the bobbin axis for leading both ends of said coil to the exterior of the motor, the yoke being formed with incisions for passing the projecting terminals.

4. A motor as defined in claim 1, wherein said yoke has parallel lateral edges joined by matching end edges.

* * * * *